April 21, 1959
J. AMBLARD
2,883,609
SELF-CLOSING CIRCUIT-BREAKERS-REGULATORS
FOR MOTOR VEHICLE GENERATORS
Filed Jan. 7, 1955
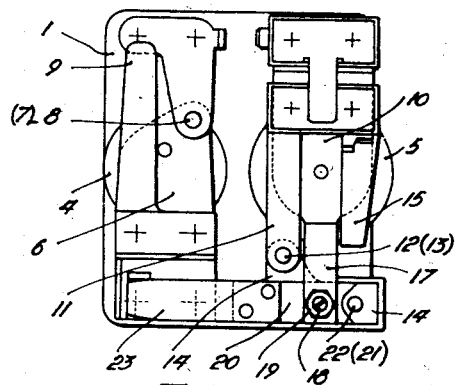
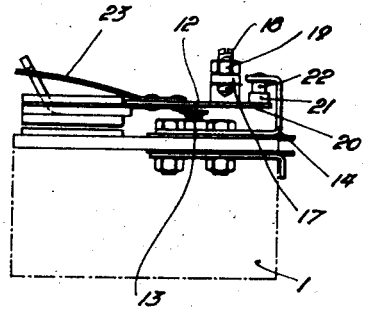
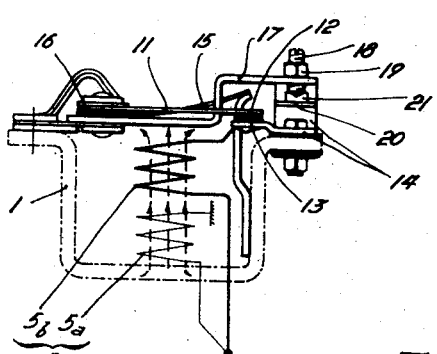
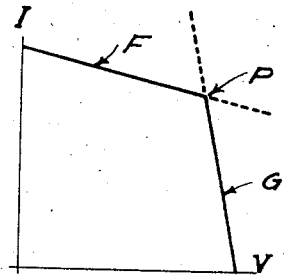
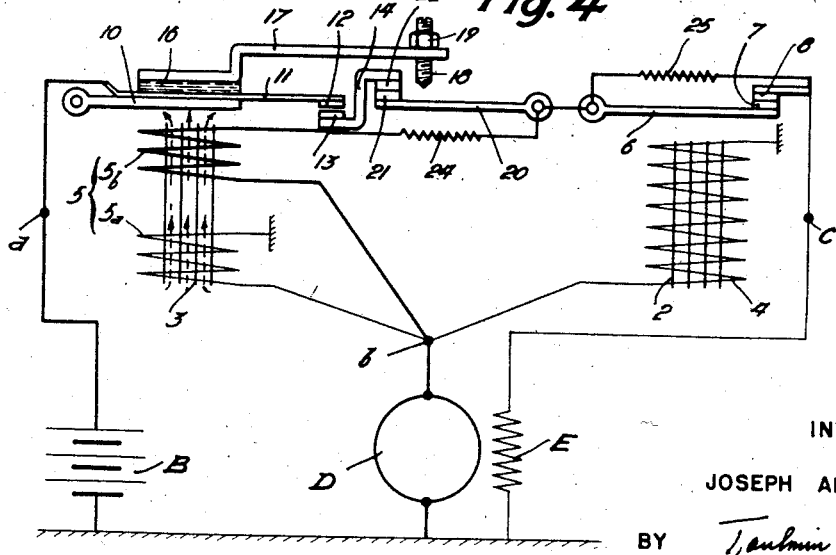
INVENTOR
JOSEPH AMBLARD
BY *Toulmin & Toulmin*
ATTORNEYS United States Patent Office 2,883,609
Patented Apr. 21, 1959

2,883,609

SELF-CLOSING CIRCUIT-BREAKERS-REGULATORS FOR MOTOR VEHICLE GENERATORS

Joseph Amblard, Paris, France

Application January 7, 1955, Serial No. 480,622

Claims priority, application France January 8, 1954

8 Claims. (Cl. 322—25)

This invention relates in particular (but not exclusively) to the apparatus known as self-closing circuit-breakers and regulators used more especially on motor vehicles to control the charging current supplied to the accumulator battery by the dynamo driven by the engine.

Apparatus already exist comprising a single electro-magnet to control the cut-in and cut-out and to regulate the intensity of the charging current.

Other known apparatus comprise two electromagnets ensuring respectively the cut-in and cut-out and the regulation of the voltage.

Finally, there is also a third class of apparatus in which the cut-in and cut-out, the regulation of the dynamo voltage and the regulation of the intensity of the charging current are controlled by three electromagnets.

The purpose of the present invention is to ensure substantially the same possibilities of regulation as the third class of apparatus mentioned above, but with a simplified construction, which reduces the cost price of the apparatus in a fairly large proportion.

The apparatus according to the invention is more particularly characterized by the fact that it comprises, combined with each other, on the one hand, a voltage regulator with a shunt winding (which regulates the current intensity) and, if necessary, a few series turns which can slightly change the regulation curve, and, on the other hand, a make-and-break and regulating device arranged, in particular, so as to limit the output in the range of high values of which the curve is more or less horizontal.

In a preferred embodiment, the apparatus has only two electromagnets, namely, one shunt-wound electromagnet for regulating the voltage and one make-and-break electromagnet (with shunt winding and series winding) the armature of which, during the first part of its attraction stroke, under the action of the shunt winding and by means of a contact of which the mobile member is carried by a flexible blade fixed to the said armature, closes the cut-in contact and, at the end of its attraction stroke, under the additional action of the series winding, which is designed accordingly, and owing to the bending of the said flexible blade permitting this end of stroke, opens a cut-out contact which is inserted in the exciting circuit of the dynamo and which limits the current supplied by the said dynamo.

When the charging current passing through the series winding (which, as a matter of fact, exists in all self-closing circuit-breakers but which, in this case, is designed for this purpose) reaches a predetermined value, the armature breaks the exciting circuit and restricts the intensity of the charging current, the said intensity also being limited according to the back electromotive force of the battery.

In the preferred embodiment of the apparatus improved as explained, the said apparatus is further characterized by the following features and combinations thereof:

The cut-out contact is actuated from the armature through a rigid control arm;

The rigid arm carries an adjustable stop, a screw for instance, which acts on the cut-out contact;

The cut-out contact is in series with the voltage regulating contact actuated by the shunt-wound electromagnet (and it only comes into operation at a predetermined value of the charging current supplied by the dynamo);

The mobile member of the cut-out contact is a flexible blade which bends in a plane forming a right angle with the plane in which the rigid control arm moves;

All the contacts are arranged on the same side of the apparatus, which facilitates its assembly.

Other special features and characteristics of the invention are brought out in the following description, which relates to a specimen embodiment of an apparatus improved according to the invention, the said embodiment being described solely by way of illustration and shown diagrammatically in the accompanying drawings, in which:

Fig. 1 is a plane view of the apparatus;

Figs. 2 and 3 are partial elevations, at an angle of 90° to each other, of the contact members of the apparatus;

Fig. 4 is a diagram of the circuits of the apparatus and its connections with the battery and dynamo;

Finally, Fig. 5 is a diagram of the intensity curve of the charging current.

The apparatus comprises a U-shaped frame 1 in the bottom of which are fixed the cores 2 and 3 of the winding 4 and the double winding 5 respectively. The winding 4 comprises a fine wire winding to control the regulation according to the voltage, while the winding 5 comprises a fine wire winding 5a to actuate the make-and-break and a coarse wire winding 5b intended to complete the cut-in, then ensure the cut-out and to regulate the charging current at a value selected according to the voltage.

The winding 4 acts on an armature 6 which carries a contact stud 7 working in conjunction with a fixed contact stud 8, and which is subjected to a spring leaf 9 tending to keep it in the position corresponding to the closing of the contact 7—8.

The double winding 5 acts on an armature 10 which carries a flexible blade 11 with a contact stud 12 working in conjunction with a contact stud 13 on a fixed lug 14. A spring leaf 15 combined with the armature 10 normally tends to maintain it in a position corresponding to the opening of the make-and-break contact 12—13.

According to the invention the armature 10 is integral, with interposition of an insulator 16, with a rigid arm 17 the end of which is fitted with an adjusting screw 18 with a locknut 19.

The end of the screw 18 can work in conjunction with a flexible blade 20 with a contact stud 21 normally bearing on a contact stud 22 carried by the fixed lug 14, the contact 21—22 being kept closed by a spring leaf 23, the arrangement being such, in addition, that during the first part of the attraction stroke, the armature 10 causes the cut-in or closure of the contact 12—13 and that, at the end of the attraction stroke, during which the flexible blade 11 bends, the said armature 10 causes the contact 21—22 to open.

The blade 20 is connected in series with the contact carrying armature 6 of the voltage regulating electro-magnet. The contacts 21—22 and 7—8 are shunted by resistances 24 and 25 respectively.

The apparatus just described which is connected to the battery B, the dynamo D and the inductor E of the said dynamo respectively through the terminals $a$, $b$ and $c$, functions in the following manner, as illustrated by the curves shown in Fig. 5 in which the section G of the curve represents the intensities given by the voltage regulator according to the voltage at the dynamo terminals, while the curve section F represents the intensities given by the cut-in-regulator according to the voltage in question and the intensity of the charging current.

When not in operation, the organs are in the position shown in Fig. 4.

As soon as the dynamo D is driven at sufficient speed for the voltage at its terminals to correspond to the cut-in voltage, the winding 5a attracts the armature 10 and closes the cut-in contact 12—13, which sets up the charging circuit of the battery B. As soon as the charging current is sent into the battery the winding 5b, through which this charging current passes and of which the direction of winding is such that its action is added to that of the winding 5a, presses more tightly on the contact 12—13, the screw 18 bearing on the blade 20.

When the voltage at the dynamo terminals exceeds a predetermined value, the voltage regulator winding 4 causes the contact 7—8 to open, and this, owing to the comparatively high value of the resistance 25 (the purpose of which is to prevent break sparks at the contact 7—8) cuts out the dynamo excitation, the consequence of which is that all the members are brought back to the position shown in Fig. 4. In reality, above a certain voltage, the contact 7—8 vibrates and an undulating current passes through the excitation circuit (E).

In practice, in this phase of regulation, the voltage at the dynamo terminals is maintained at a substantially constant value, and the intensity of the charging current depends solely on the back electromotive force of the battery. The corresponding intensity curve is marked "G" in Fig. 5.

The spring 23 is so adjusted that, during the above-mentioned phase, the force exterted by the armature 10 is not sufficient to open the contact 21—22. It is only at and above a predetermined and well-defined value of the intensity of the charging current that the attraction of the armature 10 becomes sufficient to overcome the resistance of the spring 23 and to bring the exciting current into play by opening the contact 21—22. The regulation effected by the contact 21—22 is brought about in the same manner as the regulation effected by the contacts 7—8 (vibrations of the contact producing an undulating exciting current). From then, on a charging current regulation curve is obtained which is independent on the back electromotive force of the battery. This curve is marked F in Fig. 5 and takes the place of the curve G at the release point P (the position of which can be arbitrarily selected for any given intensity).

It is obvious that the specimen embodiment of the self-closing circuit breaker and voltage and intensity regulator, as described above and shown in the accompanying drawing, has been given only by way of illustration and is in no way restrictive, and that any changes of detail can be made therein without this involving a deviation from the spirit of the invention.

What I claim is:

1. In a self closing circuit-breaker and voltage regulator unit for controlling the output voltage and current of a dynamo having a shunt excitation winding and intended for the charge of an accumulator battery, comprising: a voltage regulator including a resistance serially connected with said excitation winding of the dynamo and a contact device in parallel with said resistance to be opened or closed in dependence on the actual dynamo voltage; a self closing circuit breaker including contact means serially connected to said dynamo and said battery and means responsive to the actual dynamo voltage to open and close said contact means in response to said voltage; and a dynamo current intensity regulator including auxiliary contact means serially connected to said contact device and connected to said dynamo, a resistance shunting said auxiliary contact means, and means responsive to said dynamo current intensity to close and open said auxiliary contact means in dependence on said current intensity, said means responsive to the actual dynamo voltage and said means responsive to said dynamo current intensity including a common movable armature cooperating with both said contact means and auxiliary contact means so as to first close said contact means before opening said auxiliary contact means.

2. In a self closing circuit breaker and voltage regulator unit as in claim 1, said means responsive to the actual dynamo voltage and said means responsive to the dynamo current intensity including further a common core arranged to cooperate with said common armature.

3. In a self closing circuit breaker and voltage regulator unit as in claim 1, said contact means further including yielding means arranged to yield in dependence on the attractive forces of both said means responsive to the dynamo current intensity and means responsive to the actual dynamo voltage and forming part of the self closing circuit breaker.

4. In a self closing circuit-breaker and voltage regulator unit for controlling the output voltage and current of a dynamo having a shunt excitation winding and intended for the charge of an accumulator battery, comprising: a voltage regulator having a core, a shunt winding wound on said core and connected to the dynamo, an armature controlled by the magnetic field of said winding, a contact device the opening of which is controlled by said armature and connected in series with the excitation winding of the dynamo, and a resistance in parallel with said contact device; and a self closing circuit breaker, having a core, a shunt winding wound on said core and connected to the dynamo, movable armature means adapted to be actuated by the magnetic field of said shunt winding and contact means comprising a fixed contact member and a mobile and yielding contact member actuable for closure by said armature means, said contact means being connected in series, with the battery to be charged; the provision of a series winding, connected to the fixed contact member and connected to the dynamo, for producing a magnetic field which adds itself to the field produced by the shunt winding of the circuit breaker and which acts on said armature means, auxiliary contact means actuable by the said armature means, so located that it is open by the armature means, only when the circuit breaker contact means is closed and yields, and connected respectively to the fixed contact member of the circuit breaker and to the contact device of the voltage regulator so as to be in series with said contact device, and a resistance in parallel with said auxiliary contact means.

5. A self closing circuit-breaker and voltage regulator unit according to claim 4, wherein the series winding is wound on said circuit-breaker core for producing a magnetic field which has the same direction as the field produced by said circuit-breaker shunt winding.

6. A self closing circuit-breaker and voltage regulator unit according to claim 4, wherein the movable armature means of the circuit breaker comprises a rigid control arm, electrically insulated from the mobile contact member, and an adjustment screw carried by said arm for acting upon the auxiliary contact means.

7. A self closing circuit-breaker and voltage regulator unit according to claim 4, wherein the auxiliary contact means comprise a flexible blade which bends in a plane forming a right angle with the plane in which the rigid control arm moves.

8. A self closing circuit-breaker and voltage regulator unit according to claim 4, wherein the contact device, the contact means and the auxiliary contact means are located on the same electrical side.

References Cited in the file of this patent

UNITED STATES PATENTS

| 772,872 | Davis | Oct. 18, 1904 |
| 2,218,109 | Hochstetter | Oct. 15, 1940 |